United States Patent
Stahl et al.

(10) Patent No.: US 11,470,904 B2
(45) Date of Patent: *Oct. 18, 2022

(54) HYDRATION SYSTEM AND COMPONENTS THEREOF

(71) Applicant: RAINMAKER SOLUTIONS, INC., El Segundo, CA (US)

(72) Inventors: Robert Gregory Stahl, Marina Del Rey, CA (US); Eduard Albert Jaeger, El Segundo, CA (US); Jacob Timm Bowles, El Segundo, CA (US)

(73) Assignee: RAINMAKER SOLUTIONS, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/963,502

(22) PCT Filed: Jan. 22, 2019

(86) PCT No.: PCT/US2019/014556
§ 371 (c)(1),
(2) Date: Jul. 20, 2020

(87) PCT Pub. No.: WO2019/144122
PCT Pub. Date: Jul. 25, 2019

(65) Prior Publication Data
US 2020/0352270 A1    Nov. 12, 2020

Related U.S. Application Data

(63) Continuation-in-part of application No. 15/874,878, filed on Jan. 19, 2018, now Pat. No. 10,357,073.

(51) Int. Cl.
*A42B 3/04* (2006.01)
*A42B 1/245* (2021.01)
*F16L 37/00* (2006.01)

(52) U.S. Cl.
CPC .............. *A42B 3/048* (2013.01); *A42B 1/245* (2013.01); *F16L 37/004* (2013.01)

(58) Field of Classification Search
CPC ......... A42B 1/24; A42B 3/048; A42B 18/086; F16L 37/004
(Continued)

(56) References Cited

U.S. PATENT DOCUMENTS 2,453,813 A * 11/1948 Prince ..................... F16L 19/05
285/89
2,793,057 A * 5/1957 McGugin .............. F16L 37/004
285/9.1
(Continued)

FOREIGN PATENT DOCUMENTS

WO    WO-2008129514 A2 * 10/2008 ............. A42B 3/048
WO       2018017545 A1    1/2018

OTHER PUBLICATIONS

International Searching Authority; Notification of Transmittal of the International Search Report and the Written Opinion of the International Searching Authority, or the Declaration, dated Mar. 22, 2019, International Application No. PCT/US2019/014556; International Filing Date Jan. 22, 2019.
(Continued)

*Primary Examiner* — Justin M Larson
(74) *Attorney, Agent, or Firm* — Hackler Daghighian Martino & Novak

(57) ABSTRACT

A headset for a hydration system is disclosed. The headset includes a fluid conduit adapted to connect to a distal end of a hydration system supply tube, and a magnetic quick connect having an upstream and a downstream coupling member. The upstream and downstream coupling members have a common mating axis and together define a portion of the fluid conduit. The upstream member also includes an off-axis arm that may be rotated about the mating axis (Continued)

without decoupling the coupling members. A headgear mount for use in headsets for hydration systems, such as the disclosed headset, is also provided.

17 Claims, 10 Drawing Sheets

(58) Field of Classification Search
USPC .................. 224/181, 183, 148.2; 285/9.1
See application file for complete search history.

(56) References Cited

U.S. PATENT DOCUMENTS

| | | | | |
|---|---|---|---|---|
| 2,879,343 | A * | 3/1959 | Finken | H04M 1/05 |
| | | | | 379/430 |
| 3,181,895 | A * | 5/1965 | Cator | F16L 37/004 |
| | | | | 285/1 |
| 3,704,002 | A | 11/1972 | Skarzynski | |
| 4,362,327 | A * | 12/1982 | Mieth | F16L 23/024 |
| | | | | 285/332.3 |
| 4,491,088 | A * | 1/1985 | Hostetler | A01K 39/0213 |
| | | | | 119/72.5 |
| 4,549,541 | A * | 10/1985 | Sundahl | A42B 3/08 |
| | | | | 128/201.19 |
| 4,763,683 | A * | 8/1988 | Carmack | F16L 37/32 |
| | | | | 137/594 |
| 5,060,833 | A * | 10/1991 | Edison | A45F 3/16 |
| | | | | 224/148.2 |
| 5,085,349 | A * | 2/1992 | Fawcett | A45F 3/20 |
| | | | | 220/703 |
| 5,355,961 | A * | 10/1994 | Gariepy | E21B 33/04 |
| | | | | 166/387 |
| 5,482,297 | A * | 1/1996 | Burns | F16J 15/062 |
| | | | | 277/644 |
| 5,571,260 | A * | 11/1996 | Krug | A45F 3/16 |
| | | | | 222/175 |
| 5,727,714 | A * | 3/1998 | Fawcett | A45F 3/16 |
| | | | | 222/175 |
| 5,984,145 | A * | 11/1999 | McAllister | A45F 3/16 |
| | | | | 222/175 |
| 6,070,767 | A * | 6/2000 | Gardner | A45F 3/16 |
| | | | | 220/703 |
| 6,283,344 | B1 * | 9/2001 | Bradley | A42B 1/24 |
| | | | | 222/175 |
| 6,523,833 | B1 * | 2/2003 | Ishigaki | F16J 15/025 |
| | | | | 277/549 |
| 6,758,213 | B1 | 7/2004 | Brekken | |
| 7,073,688 | B2 * | 7/2006 | Choi | A45F 3/20 |
| | | | | 141/379 |
| 7,252,112 | B1 * | 8/2007 | Imler | F16L 37/004 |
| | | | | 137/614.04 |
| 7,490,740 | B2 * | 2/2009 | Robins | A45F 3/20 |
| | | | | 222/175 |
| 7,793,987 | B1 * | 9/2010 | Busch | F16L 37/004 |
| | | | | 285/9.1 |
| 8,079,600 | B2 * | 12/2011 | Shojima | F16J 15/062 |
| | | | | 277/644 |
| 8,181,972 | B2 * | 5/2012 | Tsuji | F16K 51/02 |
| | | | | 277/644 |
| 8,770,190 | B2 * | 7/2014 | Doherty | A61M 16/021 |
| | | | | 128/202.27 |
| 9,140,393 | B2 * | 9/2015 | Wolff | F16L 37/004 |
| 9,402,119 | B2 * | 7/2016 | Contreras Hernandez | |
| | | | | H04R 1/083 |
| 9,440,248 | B2 * | 9/2016 | Pouliaude | B05B 11/3045 |
| 9,803,787 | B2 * | 10/2017 | Scott | F16L 37/004 |
| 10,016,569 | B2 | 10/2018 | Flower et al. | |
| 10,179,726 | B2 * | 1/2019 | Steele | B67D 1/0888 |
| D853,658 | S * | 7/2019 | Bowles | D29/122 |
| 10,357,073 | B1 * | 7/2019 | Stahl | A42B 1/24 |
| 10,421,655 | B1 * | 9/2019 | Steele | A45F 3/16 |
| D870,998 | S * | 12/2019 | Bowles | D29/122 |
| D870,999 | S * | 12/2019 | Bowles | D29/122 |
| D871,698 | S * | 12/2019 | Bowles | D29/122 |
| D871,699 | S * | 12/2019 | Jaeger | D32/31 |
| 11,125,365 | B2 * | 9/2021 | Chung | F16L 37/004 |
| 2003/0209861 | A1 * | 11/2003 | Keene | E21B 33/1212 |
| | | | | 277/603 |
| 2005/0238193 | A1 * | 10/2005 | Chen | A62B 23/02 |
| | | | | 381/376 |
| 2005/0241641 | A1 * | 11/2005 | Fletcher | A62B 18/086 |
| | | | | 128/205.22 |
| 2006/0180154 | A1 * | 8/2006 | Stone | A42B 3/048 |
| | | | | 128/207.11 |
| 2008/0029972 | A1 * | 2/2008 | Smathers | F16J 15/062 |
| | | | | 277/641 |
| 2008/0143098 | A1 | 6/2008 | Zimmerman et al. | |
| 2009/0146412 | A1 * | 6/2009 | Schoenoff | F16L 37/004 |
| | | | | 285/9.1 |
| 2010/0322826 | A1 * | 12/2010 | Locascio | B01J 19/0093 |
| | | | | 422/537 |
| 2011/0042485 | A1 * | 2/2011 | McNulty | B05B 15/628 |
| | | | | 239/203 |
| 2011/0084474 | A1 * | 4/2011 | Paden | F16L 37/004 |
| | | | | 285/9.1 |
| 2012/0013117 | A1 | 1/2012 | Bernshtein | |
| 2012/0246809 | A1 * | 10/2012 | Elam | A42B 3/286 |
| | | | | 2/424 |
| 2014/0318650 | A1 * | 10/2014 | Wolff | F16L 37/004 |
| | | | | 137/614.02 |
| 2015/0059445 | A1 * | 3/2015 | Tragsdorf | B65D 43/22 |
| | | | | 73/49.2 |
| 2017/0035136 | A1 | 2/2017 | Van Heerden | |
| 2017/0370513 | A1 * | 12/2017 | Waugh | F16L 27/026 |
| 2018/0035787 | A1 * | 2/2018 | Jaeger | A47G 21/185 |
| 2018/0192724 | A1 * | 7/2018 | Jaeger | A42B 1/24 |
| 2018/0195654 | A1 * | 7/2018 | Jaeger | A42B 3/0406 |
| 2019/0090579 | A1 * | 3/2019 | Hernandez Torres | A42B 3/283 |
| 2020/0100552 | A1 * | 4/2020 | Jaeger | A42B 3/048 |
| 2020/0116284 | A1 * | 4/2020 | Ashida | F16L 37/004 |
| 2020/0124217 | A1 * | 4/2020 | Ghodrati | F16L 15/006 |
| 2020/0352270 | A1 * | 11/2020 | Stahl | A42B 1/245 |
| 2020/0386354 | A1 * | 12/2020 | Zoe | F16G 11/10 |
| 2021/0131594 | A1 * | 5/2021 | Kulick | F16L 37/004 |

OTHER PUBLICATIONS

International Searching Authority, PCT, Written Opinion of the International Searching Authority, dated Mar. 22, 2019, International Application No. PCT/US2019/014556; International Filing Date Jan. 22, 2019.
International Searching Authority, PCT, International Search Report, dated Mar. 22, 2019, International Application No. PCT/US2019/014556; International Filing Date Jan. 22, 2019.
European Patent Office, Communication, Extended European Search Report, dated Apr. 12, 2021, Application/Patent No. 19741459.2 1017/3740095; PCT/US2019014556, 1pp.
European Patent Office, Supplementary European Search Report, dated Mar. 31, 2021, Application No. EP19741459.2, 2pp.
European Patent Office, Written Opinion, cf Form 1507, dated Mar. 31, 2021, Application No. EP19741459.2, 3pp.

* cited by examiner

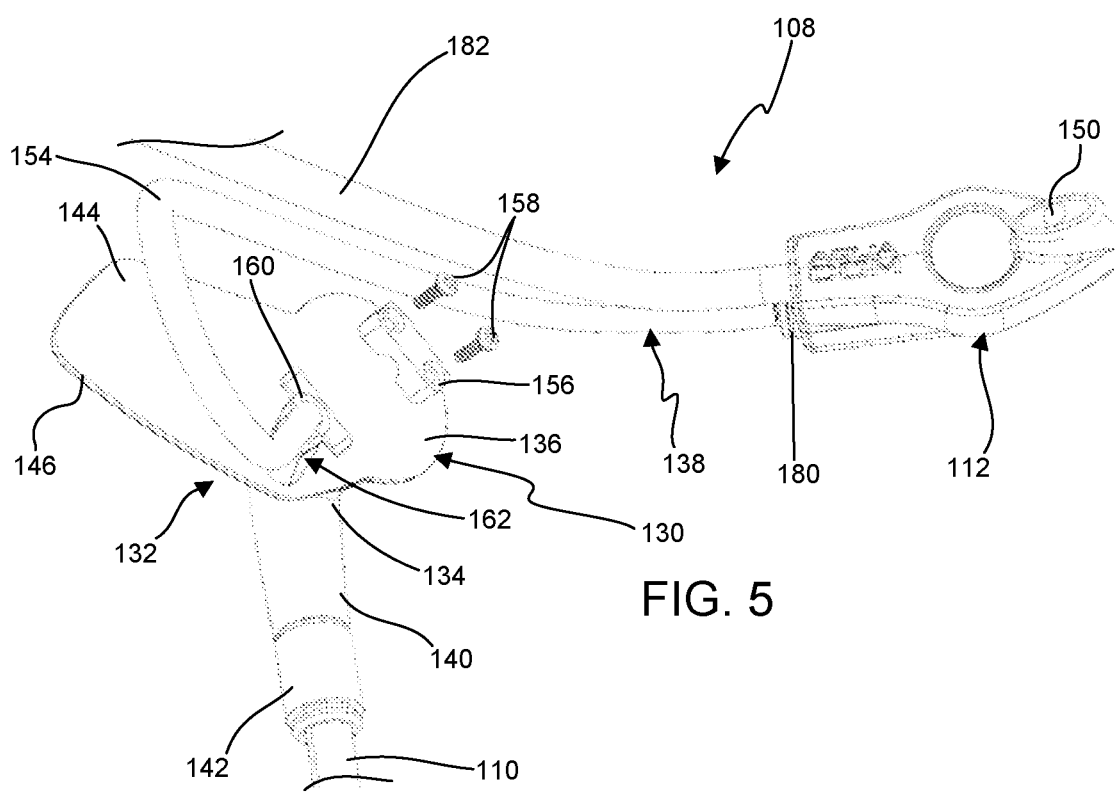
FIG. 5
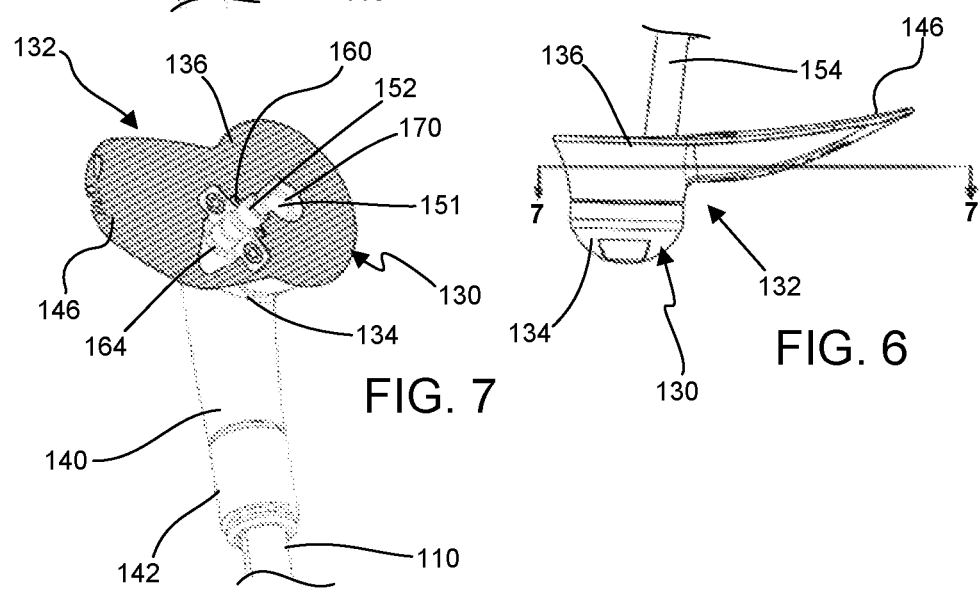
FIG. 7
FIG. 6

HYDRATION SYSTEM AND COMPONENTS THEREOF

CROSS-REFERENCE TO RELATED APPLICATIONS

This application is the U.S. National Stage of International Application No. PCT/US2019/014556, filed on Jan. 22, 2019, which is a continuation-in-part of U.S. patent application Ser. No. 15/874,878, filed on Jan. 19, 2018, now issued as U.S. Pat. No. 10,357,073, issued on Jul. 23, 2019, the disclosures of which are incorporated in their entirety by reference herein.

FIELD

The present patent document relates to hydration systems and various components thereof, including headsets for hydration systems.

BACKGROUND

Medical research has demonstrated the importance of maintaining adequate hydration to maintain a person's physical and mental health. Serious consequences can occur due to the lack of proper hydration. These consequences can range in severity from fatigue and nausea to loss of consciousness and even death. To maintain optimum health, physicians generally recommend that under normal conditions individuals drink at least eight 8 ounce (240 ml) glasses of water a day (for a total of a gallon of water per day). When an individual is under physical exertion, exposed to extreme environmental conditions, and/or over weight, the amount of fluids that the individual needs to consume generally increases because the individual's rate of fluid loss increases under such circumstances. Thus, regardless of whether a person is exercising, working, or simply resting, maintaining proper hydration and peak performance (both physical and mental) requires the regular ingestion of fluids, which in turn requires the availability of fluids to ingest.

Various portable devices have been developed to help address the availability problem. These devices have included, for example, aluminum canteens and plastic water bottles. While these devices are reasonably light, durable, and inexpensive, they do not allow hands-free fluid consumption, which may be desirable or even extremely important in some applications. In addition, they are often awkwardly mounted to a waist belt or in a pocket of a backpack, making the process of accessing them during certain activities impractical and even unsafe. As a result, individuals using these types of portable devices often go without fluids longer than they should. Frequently, this is because the user has to wait for a suitable break in their activity before safely reaching for the water bottle or canteen. Because of the inconvenience and/or safety issues, individuals using these types of devices also often wait until they feel thirsty before finding a suitable break in whatever activity they are engaged to have a drink. The problem with this approach, however, is that by the time a person is thirsty, they are already dehydrated and thus their body is no longer capable of optimal performance. In addition, if an individual waits too long to properly hydrate, their body can begin to cramp, causing pain and a further reduction in the individual's ability to engage in physical activity. Moreover, a person does not immediately recover from dehydration by drinking water or other fluids. This is because the cells of the human body begin to shut down once the human body becomes dehydrated, and it is only through a slow process of re-hydration that the cells of the body can recover and begin to function properly again.

More recently, personal hydration systems have been developed that offer a number of advantages over water bottles and canteens, including improved fluid delivery capabilities and convenience. These systems frequently include either a semi-rigid or flexible bag-like fluid reservoir that may be carried in a pack on the user's back or waist. These systems permit a user to drink more frequently while engaged in a variety of sporting, recreational, and work-related activities because a long flexible drink tube is connected to the reservoir through an exit port at one end and terminates in a mouthpiece with a bite valve at the other end. The tube is long enough to allow the mouthpiece to be carried in the user's mouth to enable the user to draw water from the reservoir at will. Examples of personal hydration systems of this type and mouthpieces therefor are disclosed in U.S. Pat. Nos. 5,727,714, 5,060,833, 5,085,349, 6,070,767, and 7,490,740.

Although personal hydration systems have generally provided a significant advance over traditional water bottles, they continue to suffer from a number of shortcomings. One shortcoming, for example, has been that the components of the hydration system downstream from the fluid reservoir have historically been either permanently secured together or secured together via a tight friction fit that tends to be difficult to establish or release. Although these types of connection structures provide suitable fluid-tight seals, they are not optimal in terms of both providing a fluid-tight seal and permitting components downstream of the reservoir to be quickly and repeatedly interchanged by a user. Moreover, these structures are not designed to permit downstream components to be easily and safely disconnected in the event of an emergency or in the event of something snagging one of the downstream components.

Mechanical quick connects, such as those described in U.S. Pat. No. 7,073,688, have been employed to allow downstream components in a personal hydration system to be quickly and repeatedly connected and disconnected. Mechanical quick connects also allow a user to quickly and easily interchange downstream components. As a result, mechanical quick connects are quite useful in many applications. One drawback of mechanical quick connects, however, is that once they are connected they can only be disconnected by pressing a release button. This can pose a significant safety problem in a number of sporting and work-related activities. Furthermore, depending on the location of the mechanical quick connect in the fluid delivery system, two hands may actually be required to connect and/or disconnect the male and female members of the quick connect provided on the mating components of the hydration system. And certainly, mechanical quick connects are not designed to permit users to attach or detach components with a single hand, or without the benefit of the user visualizing the male and female members of mechanical quick connect that are to be connected or disconnected.

Another shortcoming in these conventional systems is that the drink tube is left dangling. As a result, when the user releases the mouthpiece located on the terminal end of the of the drink tube from the user's mouth, the tube will fall away from the user's mouth and require the user to retrieve the drink tube and put the mouthpiece back in his or her mouth the next time another drink is desired. However, it may not be practical (or even safe) for a user to manipulate the drink tube in this manner during certain activities, for example when the user is traveling at a high rate of speed, such as on a bicycle, in a race car or on a motorcycle. Yet, it is also not always practical, or even desirable, for the user to keep the mouthpiece in his or her mouth at all times.

Headgear has been developed to facilitate hands-free hydration. The headgear is designed to permit the bite-valve of the drink tube to be adjustably located in front of the user's mouth. A variety of different types of headgear of this type are described in U.S. Pat. No. 6,283,344 to Bradley, which is hereby incorporated by reference. The various types of headgear described in the Bradley patent are all designed to be worn on the user's head such that an intermediate portion of the drink tube is located vertically above the user's mouth. The configuration employed in the Bradley patent is designed so that when the user is riding a bicycle or the like, fluids can be provided from a back mounted hydration pack to the user via gravity or a siphon, thereby reducing the amount the user has to suck on the bite valve, which is located on the terminal end of the drink tube, to draw fluids from the hydration reservoir to the user's mouth. All of the connectors used in the headgear described in Bradley, however, are of the friction fit variety. As a result, the portion of the drink tube that extends from the headgear to the fluid reservoir is subject to being snagged by objects in the environment in which the user is performing his or her activity. For example, a tree limb could snag the drink tube as a bicyclist is riding past a tree. If the drink tube is snagged in this manner, the headgear can potentially be ripped from the user's head and/or the user can be injured. Also, if a portion of the hydration system is attached to a vehicle, such as a car, truck, motorcycle, or bicycle, the use of all friction fit type connectors can pose a significant safety problem. For example, it complicates the ability of a safety crew to extract a driver from the vehicle should the need arise. It also complicates the ability of the driver to separate him or herself from the vehicle in both emergency situations, as well as non-emergency situations.

SUMMARY

In one embodiment, a headset for a personal fluid delivery system includes a fluid conduit adapted to connect to a distal end of a hydration system supply tube and a magnetic quick connect. The magnetic quick connect has an upstream and a downstream coupling member with a common mating axis and which together define a portion of the fluid conduit. The upstream member also includes an off-axis arm that can rotate about the mating axis without decoupling the coupling members.

Some embodiments also include a mount adapted to support the quick connect on headgear adapted to be worn on a user's head. For example, the mount may be (i) configured to attach to headgear and support the headset on the headgear once attached, (ii) attached to headgear, or (iii) at least partially formed integral with headgear.

In some embodiments, the upstream coupling member may include a fluid connector adapted to connect to the distal end of a hydration supply tube. The fluid connector may, for example, comprise a push to connect type connector or any other suitable connector. A valve may also be interposed in the fluid conduit between the connector and a downstream end of the upstream member of the magnetic quick connect. In some embodiments, the headset may also include a valve interposed in the fluid conduit between the magnetic quick connect and a fluid outlet port of the fluid conduit. To the extent the valves are included, they may, for example, comprise a check valve, or one-way valve, such as a ball valve. The fluid outlet port may, for example, comprise a nozzle.

In some implementations, at least a portion of the fluid conduit downstream of the magnetic quick connect may be configured to be selectively adjustable to allow the selective positioning of a fluid outlet port proximate to a user's mouth. For example, at least a portion of the fluid conduit downstream of the magnetic quick connect may comprise a flexible tube. The headset may also include an adjustable arm for supporting the flexible tube on the headgear and configured to permit positioning of a fluid outlet port proximate a user's mouth.

In some embodiments, the headgear may comprise safety headgear, such as a helmet or hard hat. In other embodiments, the headgear may comprise other common headgear such as, for example, eye glasses, a hat, a head bracket, headphones, or any other garment or device intended to be worn on a person's head. Further, a headset of the present patent document may be attached to, or integrated with, any type of helmet, including, for example, motorcycle helmets (half, three quarter, open face, and full face), auto racing helmets, cycling helmets, snowboarding and skiing helmets, mountain climbing helmets, military and other tactical helmets, fire helmets, safety helmets, rescue helmets, and welding helmets. Further, as noted above, the mount of the headset may be configured to attach to the headgear, it may already be attached to the headgear, or at least a portion of the mount may be formed integral with the headgear.

In some embodiments the mount may be further configured to support the headset on the headgear so that when the headgear is worn on a user's head, at least a portion of the magnetic quick connect is disposed behind the user's ear. Thus, for example, in embodiments where the mount is configured to attach to headgear, such as a hat or helmet, the mount may be configured to attach to the headgear so that when the headset is attached to the headgear and the headgear is worn on a user's head, the magnetic quick connect is at least partially disposed behind the user's ear. In other embodiments, however, the mount may be configured to attach to the headgear so that when the headgear is worn by the user the magnetic quick connect will be disposed in front of the user's ear.

In one implementation, the headgear comprises a helmet and at least a portion of the mount is formed integral with the helmet.

In some embodiments, an axial pull force along the mating axis that is set in the range of 45 ounce-force and to 100 ounce-force between the upstream member and downstream member of the magnetic quick connect is required to decouple the upstream and downstream members of the magnetic quick connect in the axial direction.

Preferably, the upstream member and downstream member of the magnetic quick connect may also be decoupled by pivoting the off-axis arm of the upstream member toward or away from the downstream member through the application of a torque that is in the range of about 6 ounce-inches to 32 ounce-inches. The off-axis arm may, for example, form a lever arm of greater than or equal to about 0.75 inches and less than or equal to about 2 inches from the pivot point. As it will be appreciated from reviewing the enclosed drawings, the location of the pivot point will depend on whether the off-axis arm is pivoted toward or away from the downstream member.

In some implementations, one of the upstream and downstream coupling members is a male coupling member and the other is a mating female coupling member. The male coupling member will typically include a protrusion and the female coupling member will typically comprise a matching protrusion receiving area defined by a protrusion mating surface. The protrusion may include an O-ring disposed around its outer perimeter in some embodiments. In such embodiment, when the male and female coupling members are coupled together, the protrusion extends into the protrusion receiving area, a first fluid communication path provided in the male coupling member and a second fluid communication path provided in the female coupling member will be in fluid communication, and the O-ring is compressed between the protrusion and protrusion mating surface. Although the protrusion may take on a variety of shapes, preferably the protrusion and protrusion mating surface have a frusto-conical shape in which their sidewalls are tapered at an angle from 15° to 50° with respect to the mating axis. More preferably, the sidewalls of the protrusion and protrusion mating surface are tapered at an angle from 25° to 35° with respect to the mating axis.

While the magnetic quick connect may comprise a male coupling member and a female coupling member, the headset is not limited in this manner. Indeed, in other implementations, the mating coupling members may not include a male and female member.

In some embodiments in which the mount comprises a helmet mount, the helmet mount is preferably elongated in one direction and includes a helmet mating surface that is shaped to generally match the curvature of the helmet to which it is to be attached in the elongated direction such that the helmet mount can be attached to the helmet using double sided tape or an adhesive pad. Further, the fluid conduit extends from an inlet of the upstream member of the first magnetic quick connect to the outlet of the downstream member of the second magnetic quick connect, and ultimately to the fluid outlet port of the headset. Further, the fluid conduit preferably extends transverse through the helmet mount from a supply tube side to a helmet side of the mount.

In another aspect of the present patent document, a headgear mount for a hydration system is provided. The headgear mount may comprise a support structure including a downstream coupling member of a magnetic quick connect, and an upstream coupling member magnetically mateable with the downstream member to define a mating axis and a fluid path extending between the coupling members. The upstream member further comprises an off-axis arm that may be rotated about the mating axis without decoupling the members. The fluid path may include an inlet port in the off-axis arm and an outlet port disposed in the downstream coupling member. The inlet port may, for example, comprise a connector, such as a push to connect connector, adapted to permit the fluid conduit to be detachably connected to a distal end of a supply tube of a hydration system so that the fluid conduit is in fluid communication with the supply tube.

In other aspects of the present patent document, a personal hydration system is provided, and in still another aspect, a fluid delivery system for a personal hydration system is provided. The personal hydration system and fluid delivery system include a headset and/or headgear as described herein.

Further aspects, objects, desirable features, and advantages of the various inventions that are the subject of the present disclosure will become manifest and be better understood from the following description considered in connection with accompanying drawings in which various embodiments of the disclosed inventions are illustrated by way of example. It is to be expressly understood, however, that the drawings are for the purpose of illustration only and are not intended as a definition of the limits of any of the disclosed inventions.

BRIEF DESCRIPTION OF THE DRAWINGS

FIG. 5 is blow up of a portion of the perspective view of FIG. 4, with a tube clamp shown in an exploded view.

FIG. 6 is a top view of a helmet mount of the headset shown in FIG. 4.

FIG. 7 is a cross-sectional view of the helmet mount taken along line 7-7 shown in FIG. 6.

DETAILED DESCRIPTION

While it should be understood that the inventions described herein are described in connection with particular examples, the scope of the inventions are not limited to the specific examples. Rather, those skilled in the art will appreciate after reviewing the present disclosure that the following teachings can be used in a much wider variety of applications than the examples specifically mentioned herein.

Figure 1:
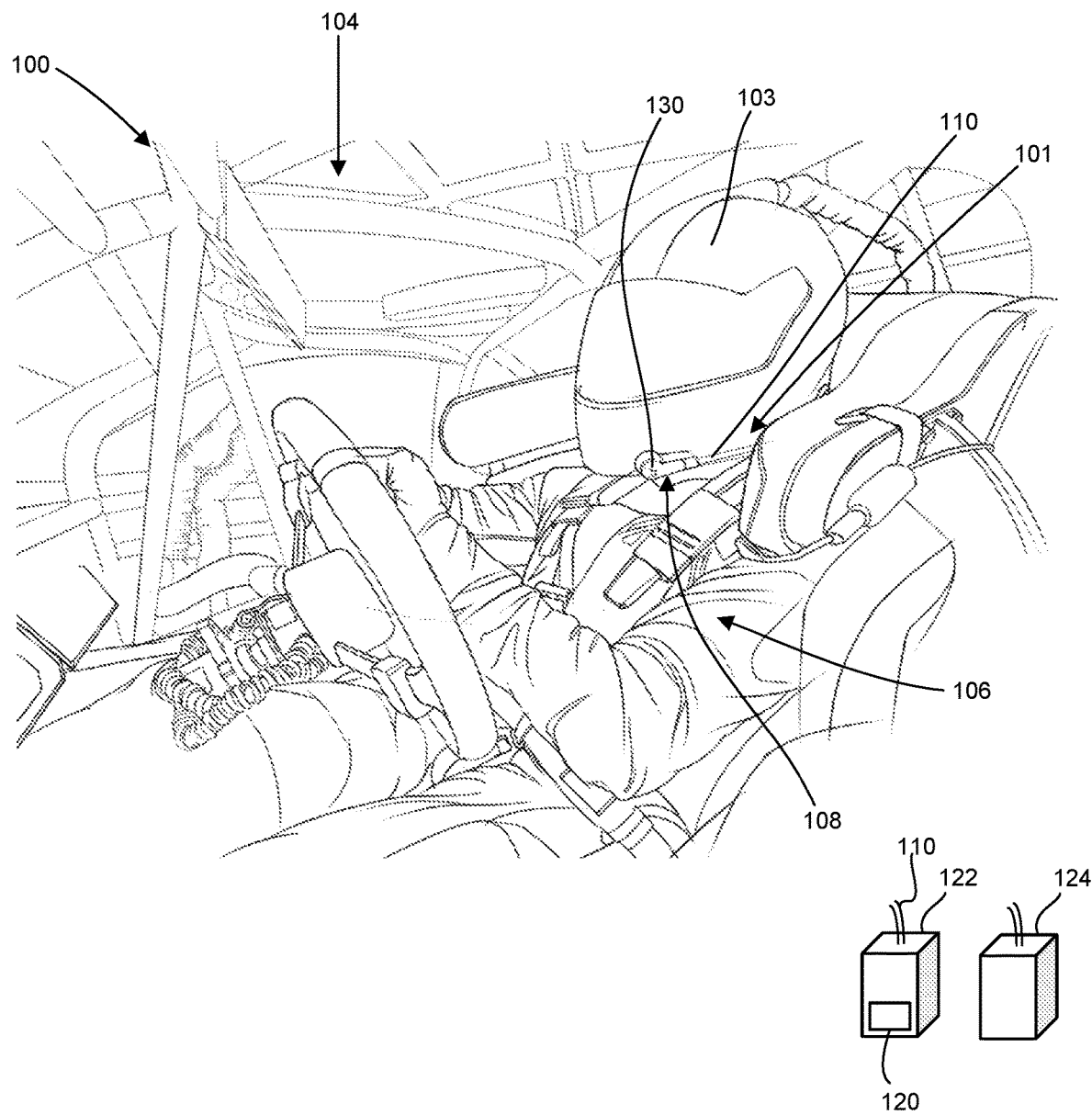
FIG. 1 illustrates an exemplary race car in which a user is employing a headset with a personal hydration system.
Figure 2:
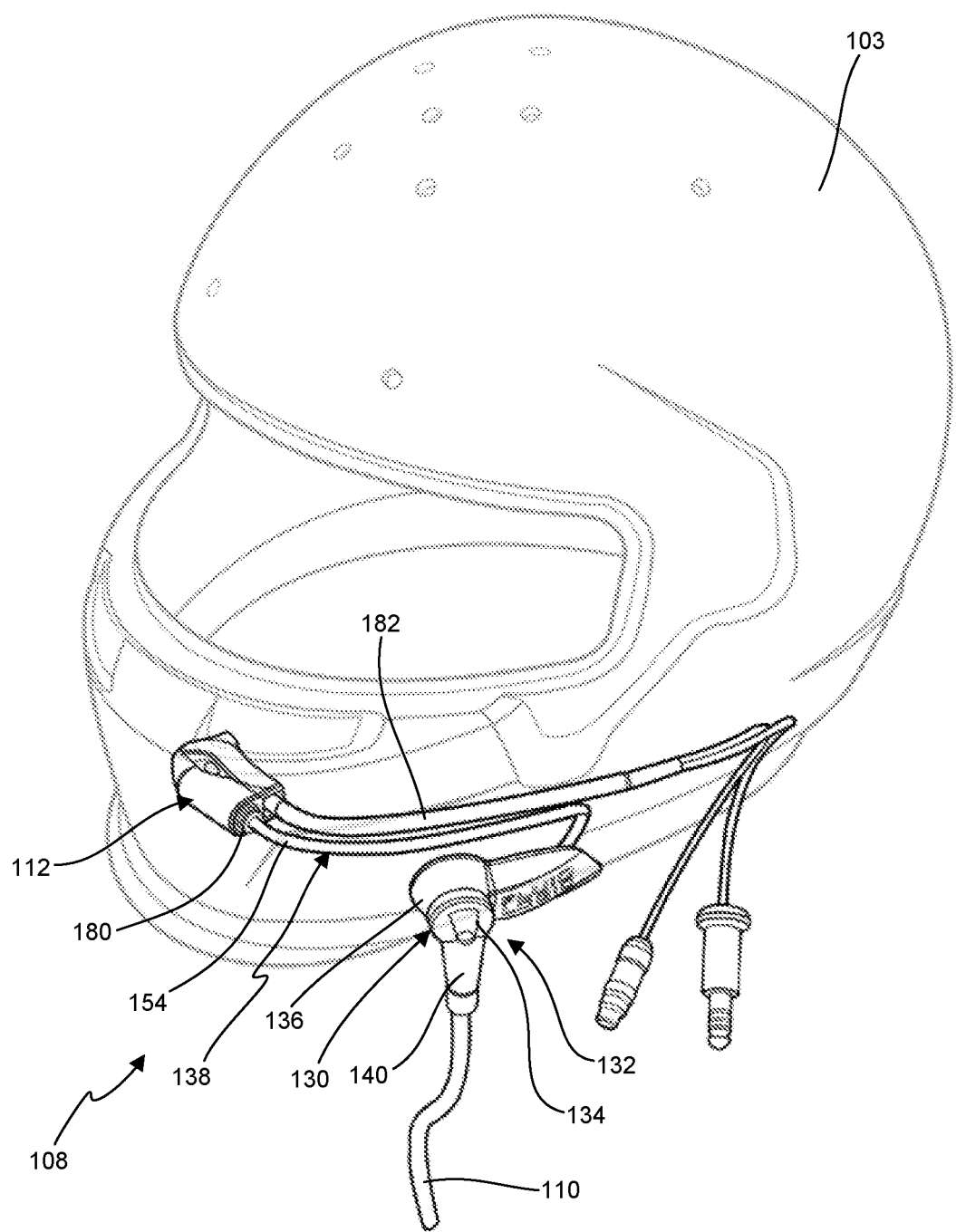
FIG. 2 illustrates an exemplary helmet including a headset for use with a personal hydration system.
Figure 3:
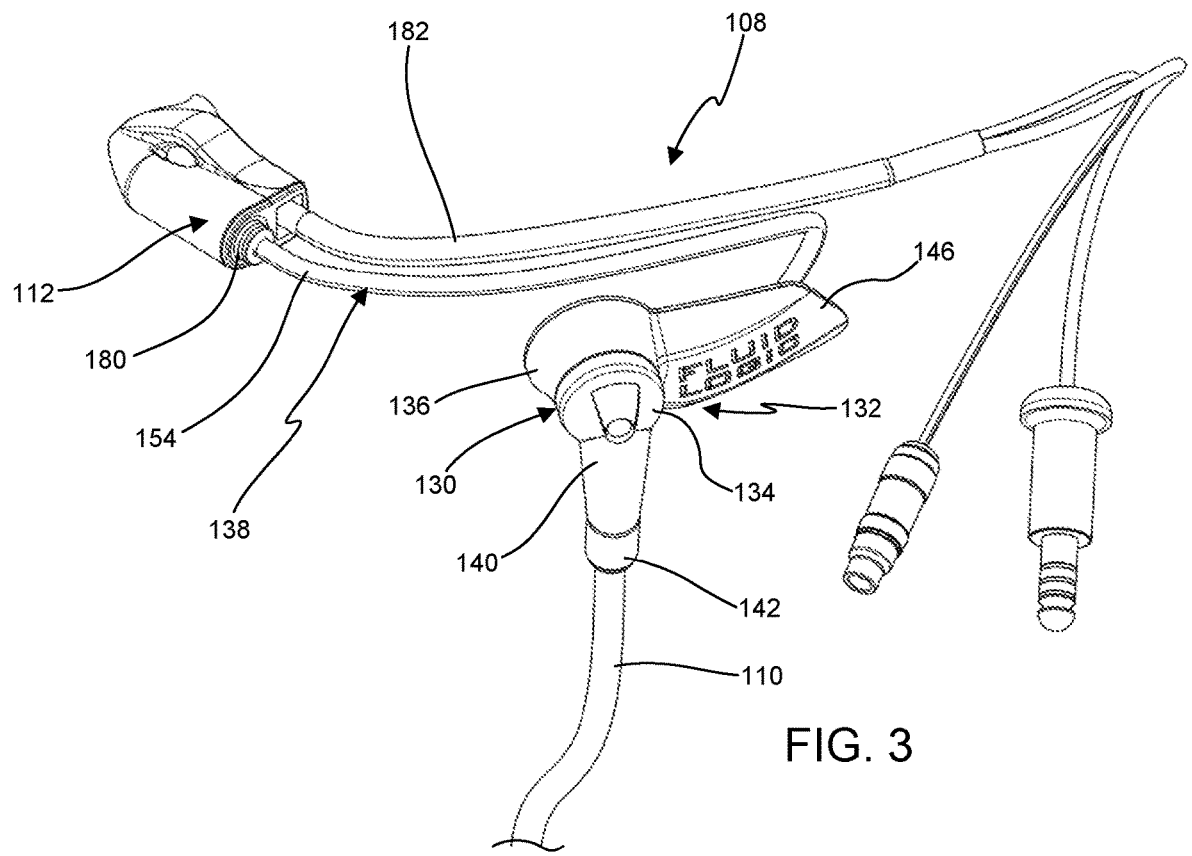
FIG. 3 is an enlarged perspective view of the headset shown in FIG. 2 from an input hose side removed from the helmet.

Referring now to the drawings in which like reference numerals designate like or corresponding components throughout the drawings, there is shown in FIGS. 1 and 2 a headset 108 according to the present disclosure for a personal hydration system 100. The headset 108 and personal hydration system 100 include a number of distinct aspects. Distinct aspects of the hydration system 100 include, for example, headset 108, magnetic quick connect 130, and mount 132.

It is to be expressly understood that each of these various aspects, as well as other inventive features of the hydration system 100 described below, both individually as well as in combination, all form distinct and separately patentable inventions contemplated by the present disclosure. Thus, for example, while each of these distinct aspects have all been incorporated into an illustrative embodiment of a hydration system 100, it is to be expressly understood that because each of these aspects are separately patentable, they can be used individually or collectively in many other hydration systems without departing from the spirit of the present disclosure. Thus, it is also to be expressly understood that the present patent disclosure is not restricted to the fluid delivery system embodiments described herein. Indeed, as will become apparent to those skilled in the art after reviewing the present disclosure, one or more aspects of the hydration system 100 may readily be incorporated into other vehicles, personal hydration systems and/or fluid delivery systems without departing from the scope of the present disclosure. Furthermore, although shown on only the driver side of the vehicle 104, one or more hydration systems 100 may be provided at any suitable location of the vehicle 104, such as at a passenger side or rear seat.

Figure 4:
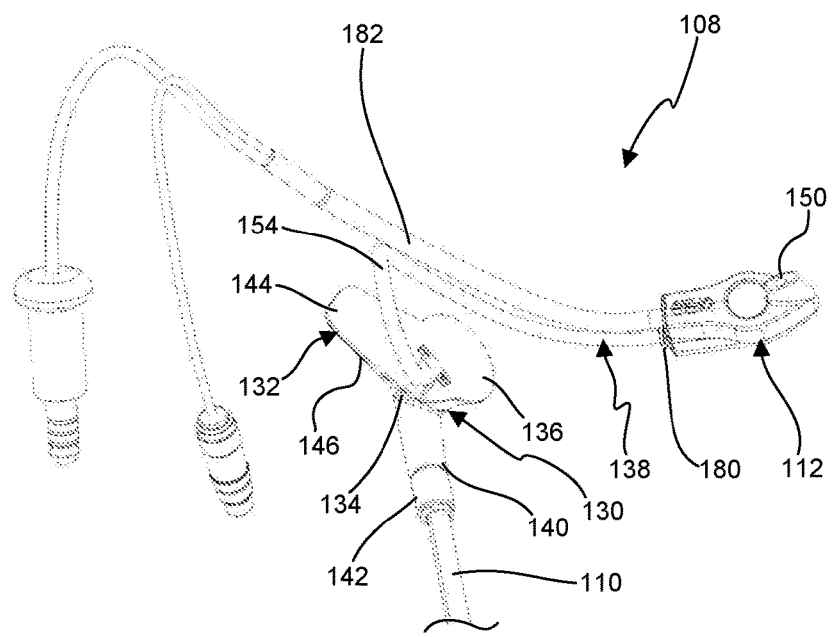
FIG. 4 is a perspective of the headset shown in FIG. 2 from the opposite, or helmet, side.

FIG. 1 illustrates a user 106 driving a vehicle 104 in the form of a race car that includes a personal hydration system 100. As discussed in greater detail herein, the personal hydration system 100 includes a fluid delivery system 101 and a fluid source (e.g., fluid source 122), and may further include an audio source (e.g., audio source 124). The fluid delivery system 101 includes everything downstream of the fluid source 122 that defines a fluid delivery path to an outlet port 150 (best seen in FIGS. 4, 5) of headset 108. In the illustrated embodiment, the fluid outlet port 150 comprises a nozzle. In other embodiments, a bite valve or other suitable outlet port may be used.

In the embodiment shown in FIG. 1, fluid delivery system 101 includes fluid control unit 120, fluid supply tube 110, and headset 108, all of which are in fluid communication with each other and fluid source 122. Fluid delivery system 101 also preferably includes a wireless actuation system 500 (shown in FIG. 13). Fluid control unit 120 and wireless actuation system 500 collectively form a wireless pump system.

The fluid and audio sources may be supported directly or indirectly on the frame of vehicle 104 without the user 106 having to carry the fluid and/or audio sources on his or her person. For example, the fluid and/or audio sources may be disposed within the cabin of vehicle 104 so as to be supported directly or indirectly by the frame of the vehicle 104 at a location behind the user 106.

The second fluid source 122 preferably comprises a potable liquid such as water or other hydration liquid, and may include a reservoir to store the potable liquid. In this way, the hydration system 100 may supply a drinkable liquid to the user 106.

The flexible reservoirs such as those provided by CAMELBAK™ are particularly well suited for use as fluid reservoir for fluid source 122. Such reservoirs will fit well in many locations within the cabin of a vehicle 104.

Although flexible hydration reservoirs, such as those provided by CAMELBAK™, are particularly well suited for use as a reservoir for fluid source 122 in the system 100 of the present patent document, any suitable sealable container can be used. For example, depending on the application the reservoir of fluid source 122 may be made from rigid, semi-rigid, or flexible material. Furthermore, in some applications, it may be desirable to use a reservoir that is insulated, such as an insulated bottle or jug, for the reservoir. Alternatively, the reservoir may be included within an insulated sleeve in some embodiments.

Regardless of the particular form of the reservoir of fluid source 122, the material or materials used in its construction (particularly any that will come in contact with the fluids contained within the reservoir) should be suitable for contact with liquids that are intended for human consumption. This is also true with the other portions of the fluid delivery system 101 that may come in contact with fluid that is transported from the fluid source 122 through the fluid delivery system 101 to the user 106.

Referring to FIG. 1, a proximal end of a fluid supply tube 110 is connected to the fluid source 122 via fluid control unit 120. The proximal end of fluid supply tube 110 is connected to the fluid control unit 120 so that fluid supply tube 110 is in selective fluid communication with the fluid source 122.

As used herein, unless otherwise specified, the terms "proximal" and "distal" are used in relation to fluid source 122. Thus, for example, the proximal end of supply tube 110 would be the end of supply tube 110 closest to the outlet port (not shown) of fluid source 122, while the distal end of fluid supply tube 110 would be the end of dispensing hose furthest away from the outlet port of fluid source 122.

As best seem in FIGS. 1-5, a magnetic quick connect 130 is interposed in the fluid deliver path of fluid delivery system 101. Interposing magnetic quick connect 130 into the fluid delivery path of fluid delivery system 101 allows the upstream components of the fluid delivery system 101 to readily be attached to and detached from downstream components of the fluid delivery system 101. In the illustrated embodiment, this means that helmet 103 together with majority of the components of headset 108 are readily separable from hydration system 100 in the event user 106 needs to exit the car or has to be extracted from the car in the event of an emergency. At the same time, user 106 can readily attach the upstream coupling member 134 to the downstream coupling member 136 of magnetic quick connect 130 using one hand and without having to view the coupling members 134, 136 when mating them together, for example, when user 106 enters vehicle 104.

Advantageously, when upstream coupling member 134 is detached from downstream coupling member 136, upstream coupling member 134 will stay attached to the distal end of fluid supply tube 110.

Referring to FIGS. 1-6, headset 108 includes a fluid conduit 138 and a magnetic quick connect 130. Fluid conduit 138 is adapted to connect to a distal end of a hydration system supply tube 110. In the illustrated embodiment, magnetic quick connect 130, flexible tube 154, and mouthpiece assembly 112 each defines a portion of the fluid conduit 138.

Figure 8:
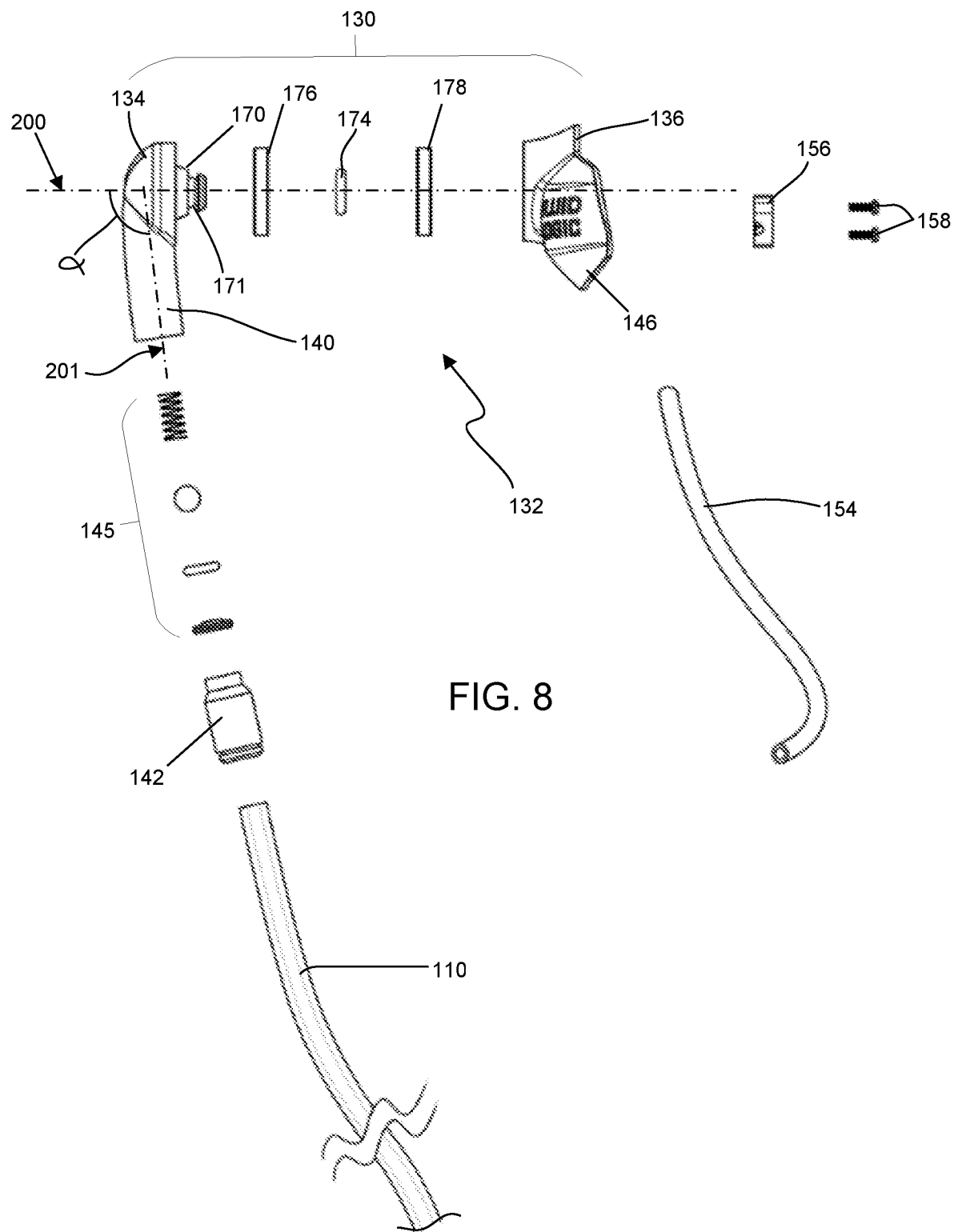
FIG. 8 is an exploded side view of the helmet mount shown in FIG. 3.
Figure 9:
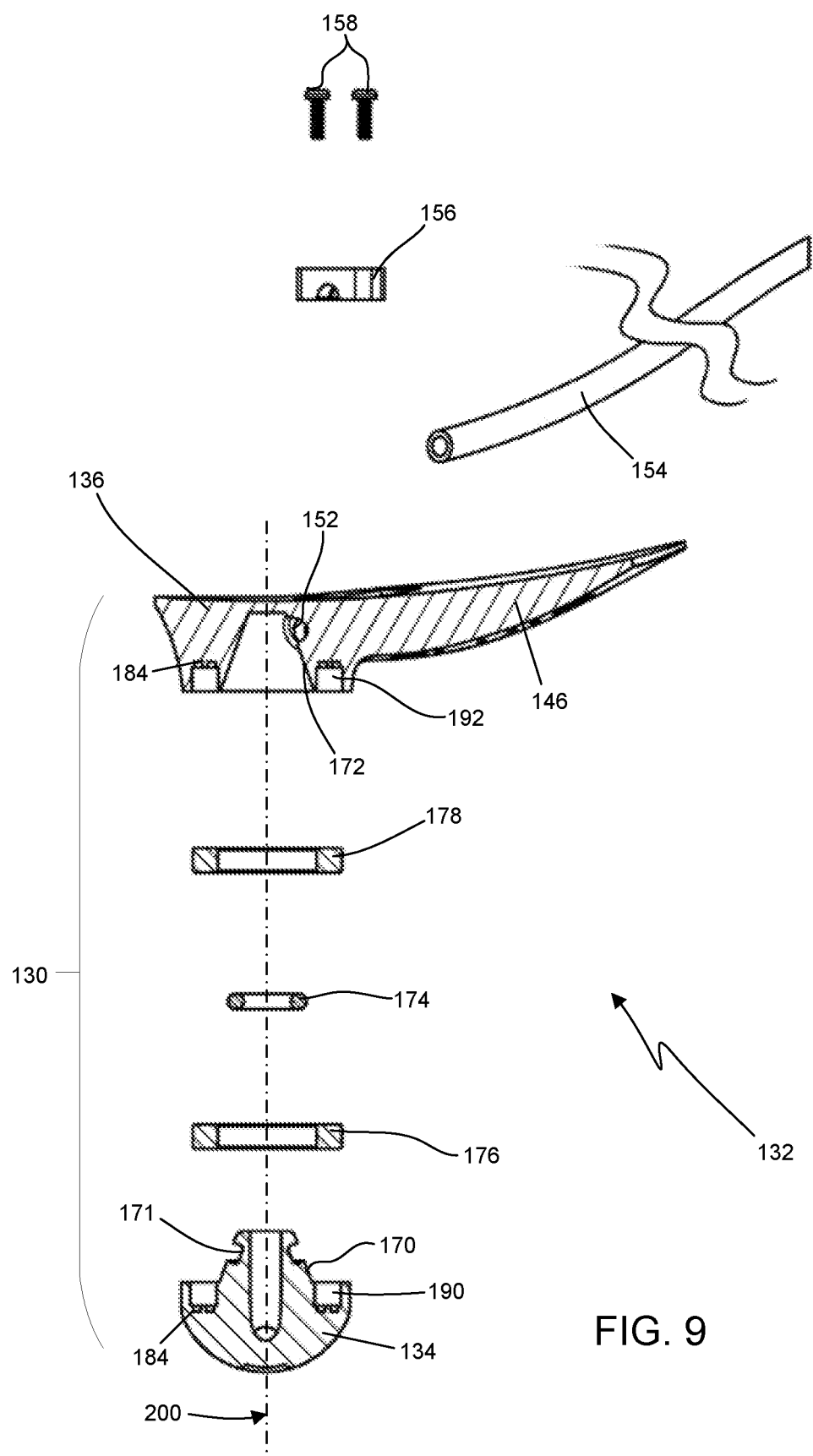
FIG. 9 is a lateral exploded cross-sectional view taken along the mating axis of the helmet mount shown in FIG. 8.

Magnetic quick connect 130 has an upstream coupling member 134 and a downstream coupling member 136. Coupling members 134, 136 share a common mating axis 200 (as best seen in FIGS. 8 and 9). Furthermore, fluid paths provided in each of the coupling members 134, 136 cooperate to define a portion of the fluid conduit 138. The upstream member 134 also includes an off-axis arm 140 that can rotate about the mating axis 200 without decoupling the coupling members 134, 136. Depending on the application, the angle α between the mating axis 200 and the axis 201 of off-axis arm 140 may be an acute angle, right angle, or obtuse angle. Preferably, the angle α is in the range of 30° to 120°. More preferably, the angle α is in the range of 70° to 120°.

Headset 108 also includes a mount 132 adapted to support the magnetic quick connect 130 on headgear adapted to worn on a user's head. In the illustrated embodiment, the mount 132 of headset 108 includes the magnetic quick connect 130. In addition, the mount 132 is configured to attach to the helmet 103. For example, double sided tape or a double sided adhesive pad may be attached to a mating surface 144 of the back side of mount 132 and used to attach mount 132 to helmet 103. In other embodiments, a suitable adhesive or other suitable attachment means may be used.

In the illustrated embodiment, mount 132 is configured to attach to the headgear 103 so that when the headgear 103 is worn by a user 106 the magnetic quick connect 130 will be disposed in front of the user's ear. In other embodiments, however, mount 132 may be configured to support the headset 108 on the headgear 103 so that when the headgear 103 is worn on a user's head, at least a portion of the magnetic quick connect 130 is disposed behind the user's ear.

Referring to FIGS. 2-9, helmet mount 132 comprises a support structure 146 and upstream coupling member 134. Support structure 146 includes the downstream coupling member 136 of magnetic quick connect 130. In the illustrated embodiment, protrusion mating surface 172 and annular channel 192 of downstream coupling member 136 are integrally formed in the support structure 146. In other embodiments, the coupling member 136 may be formed entirely separate from the support structure and then attached thereto using any suitable means, including for example adhesive and/or mechanical means.

Upstream coupling member 134 and downstream coupling member 136 are configured to magnetically mate with one another to define the mating axis 200 and a fluid path 151 extending between the members. Magnetic mating is achieved using first and second annular magnetic materials 176, 178. Annular channel 192 in the downstream coupling member 136 is sized for holding annular magnetic material 178 therein. Similarly, upstream coupling member 134 includes an annular channel 190 sized to hold annular magnetic material 176 therein. The first and second magnetic materials 176, 178 may comprise a material selected from the group consisting of a ferromagnetic material and ferrimagnetic material. At least one of the first and second annular magnetic materials 176, 178 is formed from a permanent magnet, preferably a rare earth magnet. In preferred embodiments both comprise annular permanent magnets. The first and second magnetic materials 176, 178 are selected to have sufficient magnetic properties so that the magnetic force of attraction between them will detachably hold the male coupling member 134 and female coupling member 136 together, preferably with sufficient force to compress O-ring 174 sufficiently to provide a liquid tight, or substantially liquid tight, seal. As a result, the male and female coupling members 134, 136 of the magnetic quick connect 130 may be quickly and repeatedly connected and disconnected from one another.

The magnetic force of attraction between coupling members 134, 136 may be increased, for example, by (i) increasing the thickness of the first and/or second magnetic materials 176, 178; (ii) increasing the cross-sectional area of the pole of the first and/or second magnetic materials 176, 178 that faces the other magnetic material ("the mating cross-sectional area"); (iii) increasing the flux density (B) and/or magnetization (M) of the first and/or second magnetic material 176, 178; and/or (iv) decreasing the thickness and/or magnetic permeability ($\mu$) of any non-magnetic material between the first and second magnetic materials 176, 178 and the mating surfaces of mating ends of male and female coupling members 134, 136, respectively. Conversely, the magnetic force of attraction between coupling embers 134, 136 may be decreased, for example, by adjusting parameters (i)-(iv) in the opposite direction.

Annular grooves 184 may be provided at the bottom of both annular channels 190, 192. The annular channels 184 may be provided to receive adhesive and facilitate the adhesive bonding of annular magnets 176, 178 within channels 190, 192.

As noted above, upstream member 134 includes an off-axis arm 140 that may be rotated about the mating axis 200 without decoupling the members. In the present embodiment, the fluid path 151 includes an inlet port in the off-axis arm 140 and an outlet 152 disposed in the downstream coupling member 136. The inlet port may, for example, be included in connector 142, which is adapted to permit the fluid path 151 (and fluid conduit 138) to be detachably connected to a distal end of a supply tube 110 of a hydration system 100 so that the fluid path 151 is in fluid communication with the supply tube 110. Connector 142 in the present embodiment comprises a push to connect type connector.

While in the illustrated embodiment, connector 142 comprises a push to connect type connector, any suitable connector may be used. And, while connector 142 may allow the distal end of tube 110 to be selectively attached and detached, as with other friction fit or mechanical connectors, connector 142 will remain connected to the distal end of fluid supply tube 110 when upstream coupling member 134 is disconnected from downstream coupling member 136. This permits user 106 to readily disconnect or connect headset 108 to hydration system 100 without difficulty.

A valve 145 may also be interposed in the fluid conduit between the connector 142 and a downstream end of the upstream member 134 of the magnetic quick connect 130. Valve 145 may, for example, comprise a check valve, or one-way valve, such as a ball valve.

Headset 108 may also include a valve interposed in the fluid conduit 138 between the magnetic quick connect 130 and the fluid outlet port 150 of the fluid conduit 138. For example, a valve may be included in mouthpiece assembly 112.

In addition to being a one-way valve or check valve, the valve included in mouthpiece assembly 112 and valve 145 may, for example, comprise a two-way valve. A food grade silicon dispensing valve, such as those used in non-drip squeezable condiment dispenser bottles, may be used as a suitable two-way valve.

Regardless of whether one-way or a two-way valve is used, the valves should open when a threshold cracking pressure is applied to each valve based on the pressure differential achieved immediately upstream and downstream of each valve. If a two-way valve is used, then the valve will open in the appropriate direction when the required pressure differential (or cracking pressure) is achieved on either side of the valve.

Inclusion of valves in headset 108 in this manner is beneficial because it helps to keep hydration fluids in the fluid delivery system 101. In other words, it keeps fluids from receding back to the fluid source 122 after the pump in fluid control unit 120 is turned off. This allows fluids to be delivered immediately following each activation of the pump, as opposed to first having to refill the supply tube 110 with fluids each time control unit 120 activates its pump.

Inclusion of valve 145 and/or a valve in mouthpiece assembly 112 will also minimize the amount of hydration fluids that escape from supply tube 110 and headset 108 when the upstream and downstream coupling members 134, 136 of magnetic quick connect 130 are decoupled from one another. This minimizes the loss of fluids from the system 100 and the leaking of fluids onto user 106.

If valve 145 is a two-way valve, fluid may flow in both directions through valve 145. As a result, when coupling member 134 is disconnected from coupling member 136, it may be connected to another source of hydration fluids so that fluid source 122 may be refilled through supply tube 110 by driving the pump in fluid control unit 120 in the opposite, or reverse, direction. On the other hand, if a one-way valve is used for valve 145, refilling is not possible through coupling member 134 because fluid may not flow in reverse through valve 145.

Referring to FIGS. 2-9, flexible tube 154 forms part of the fluid conduit 138 in the illustrated embodiment. Flexible tube 154 is in fluid communication with the outlet 152 at one end and a fluid path that extends through the mouthpiece assembly 112 at the other end. The upstream end of tube 154 is disposed in a recess 162 provided in the support structure 146 so that it abuts an O-ring 160 provided at the mouth of outlet 152. The upstream end of tube 154 is held against O-ring 160 with a C-clamp member 156 and fasteners 158. When clamp member 156 is tightened down, it forces the outer surface of flexible tube 154 into triangular shaped ridges 164 provided in recess 162. Tube 154 may thereby be held against O-ring 160 in a watertight manner.

The downstream end of tube 154 is connected to the fluid path that extends through the mouthpiece assembly 112 with a connector 180 disposed at an upstream end of the mouthpiece assembly 112. Connector 180 may, for example, comprise a push to connect type connector. However, any suitable connector may be used for connector 80.

Headset 108 also includes an adjustable arm 182 for supporting the flexible tube 154 on the headgear 103 and is preferably configured to permit positioning of fluid outlet port 150 proximate a user's mouth.

In the illustrated embodiment, the headgear 103 comprises a helmet. Further, at least a portion of the mount 132 may be formed integral with the helmet instead of being attached thereto.

In some embodiments, the axial pull force along the mating axis 200 may be set in the range of 45 ounce-force and to 100 ounce-force between the upstream member 134 and downstream member 136 of the magnetic quick connect 130 in order to decouple the upstream and downstream members 134, 136 of the magnetic quick connect 130 in the axial direction.

Preferably, the upstream member 134 and downstream member 136 of the magnetic quick connect 130 may also be decoupled by pivoting the off-axis arm 140 of the upstream member 134 toward or away from the downstream member 136 through the application of a torque that is in the range of about 6 ounce-inches to 32 ounce-inches through the application of a suitable force to the off-axis arm 140. The off-axis arm 140 may forms a lever arm. The lever arm, may for example, be greater than or equal to about 0.5 inches and less than or equal to about 2 inches from the pivot point, more preferably 0.75 inches to about 2 inches. As will be appreciated from reviewing the enclosed drawings, the location of the pivot point will depend on whether the off-axis arm 140 is pivoted toward or away from the downstream coupling member 136.

In some implementations, one of the upstream and downstream members 134, 136 is a male coupling member and the other is a mating female coupling member. In the present embodiment, the upstream member 134 is the male coupling member and the downstream member 136 is the female coupling member. The male coupling member will typically include a protrusion 170 and the female coupling member will typically comprise a matching protrusion receiving area defined by a protrusion mating surface 172. The protrusion 170 may include an O-ring 174 disposed in an annular channel 171 sized to receive and hold the O-ring 174 around the outer perimeter of the protrusion 170. When the male and female coupling members 134, 136 are coupled together in such embodiments, the protrusion 170 extends into the protrusion receiving area, a first fluid communication path provided in the male coupling member 134 and a second fluid communication path provided in the female coupling member 136 will be in fluid communication to form fluid path 151, and the O-ring 174 is compressed between the protrusion 170 and protrusion mating surface 172. Although the protrusion 170 may take on a variety of shapes, preferably the protrusion 170 and protrusion mating surface 172 have a frusto-conical shape in which their sidewalls are tapered at an angle from 15° to 50° with respect to the mating axis 200. More preferably, the sidewalls of the protrusion and protrusion mating surface are tapered at an angle from 25° to 35° with respect to the mating axis 200.

While the magnetic quick connect 130 may comprise a male coupling member and a female coupling member, the headset is not limited in this manner. Indeed, in other implementations, the mating coupling members 134, 136 may not include a male and female member.

As seen in the illustrated embodiment, helmet mount 132 is preferably elongated in one direction and includes a support structure 146 with a helmet mating surface 144 that is shaped to generally match the curvature of the helmet to which it is to be attached in the elongated direction such that the helmet mount 132 can be attached to the helmet 103 using double sided tape or an adhesive pad. Further, the fluid path 151 that extends through the magnetic quick connect 130 preferably extends transverse through the helmet mount 132 from a supply tube side to a helmet side of the mount 132.

While in the illustrated embodiment, mount 132 of headset 108 is configured to be attached to the headgear in the form of a helmet 103, in other embodiments the mount may be attached to the headgear or at least partially formed integral with the headgear.

Further, mount 132 may be configured to be attached to or be integral with a variety of other safety or non-safety headgear. For example, the headgear to which mount 132 is configured to be attached or formed integral with may comprise common headgear such as, for example, eye glasses, safety glasses, sun glasses, hats, head brackets, headphones, or any other garment or device intended to be worn on a person's head. Further, the headset 108 of the present patent document may be attached to, or integrated with, any type of helmet, including, for example, motorcycle helmets (half, three quarter, open face, and full face), auto racing helmets, cycling helmets, snowboarding and skiing helmets, mountain climbing helmets, military and other tactical helmets, fire helmets, safety helmets, rescue helmets, and welding helmets.

Figure 13:
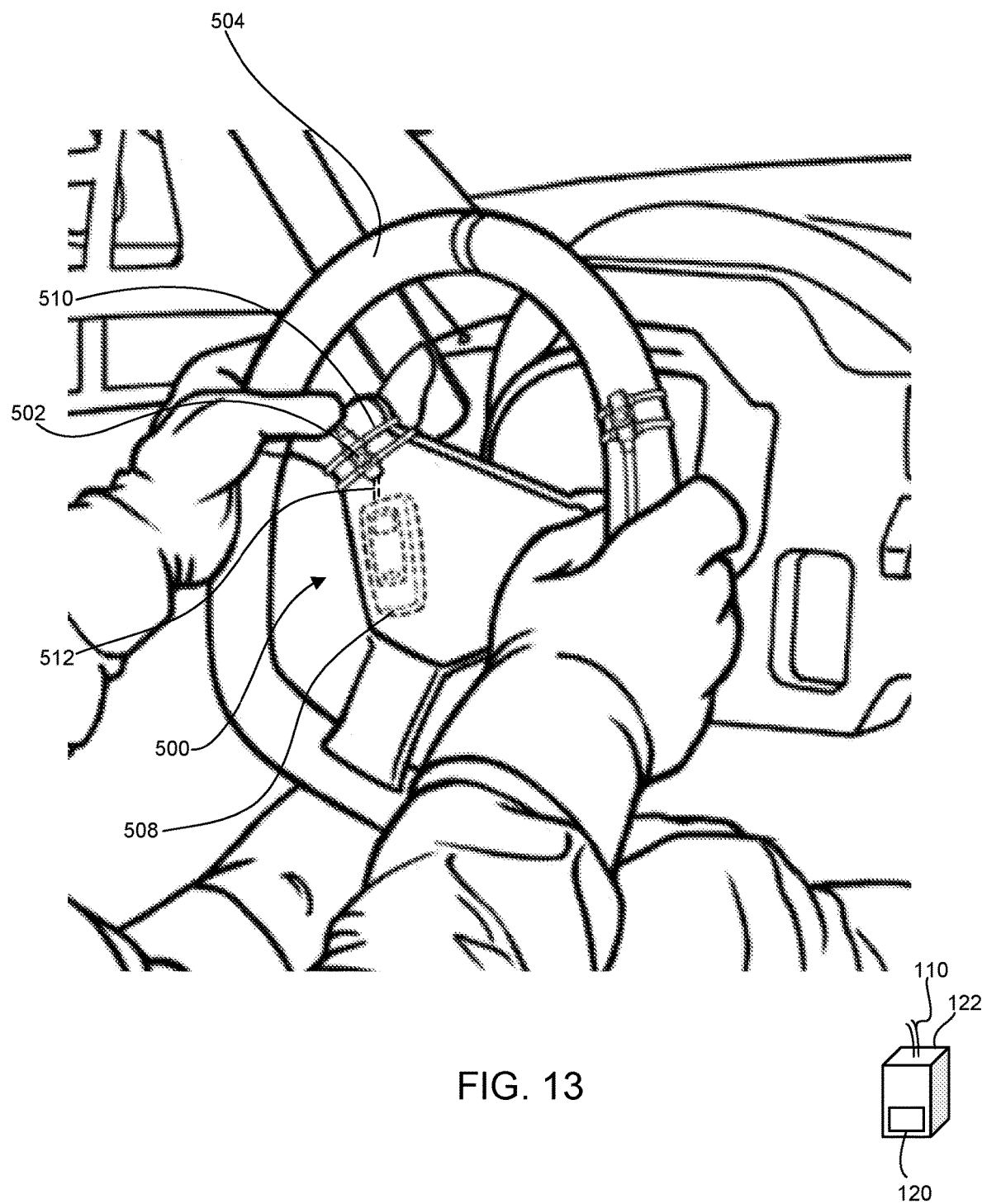
FIG. 13 illustrates an exemplary actuation system for use with a fluid delivery system.

Referring now to FIG. 13, the fluid delivery system 101 further includes a wireless actuation system 500 for remotely controlling the actuation of the fluid control unit 120 connected to the fluid source 122. A switch 502, preferably a microswitch, is operably connected to the fluid control unit 120 connected to the fluid source 122 so that operation of the microswitch 502 controls the operation of the fluid control unit 120. The microswitch 502 is mounted on the steering wheel 504 in a location sufficiently proximate to where a hand of user 106 would grip the steering wheel 504 to steer the vehicle 104. In this way, the user 106 can operate the microswitch 502 without the user 106 removing his or her hand from the steering wheel 504. In the embodiment illustrated in FIG. 13, the microswitch 502 is mounted sufficiently proximate the left-hand grip. In another embodiment, the microswitch 502 may be mounted sufficiently proximate the right-hand grip. In still another embodiment, a first microswitch 502 may be mounted sufficiently proximate the left-hand grip, and a second microswitch 502 may be mounted sufficiently proximate the right-hand grip. The microswitches 502 may be mounted a wheel portion of the steering wheel 504, or may be mounted at a hub of the steering wheel 504. Furthermore, the microswitches 502 may be mounted at a front portion, at a rear portion, and/or at a side portion of the steering wheel 504.

In a preferred approach, the microswitch 502 is operably connected to the fluid control unit 120 via a wireless connection between control unit 120 and a wireless transmitter 508 that is removably mounted on the steering wheel 504 proximate the microswitch 502. In other approaches, however, the microswitch 502 may be operably connected to control unit 120 by being hard wired to the control unit 120. The control unit 120 includes a pump (not shown) that is in turn operably connected to the fluid source 122 so as to control the dispensing of fluid from the second source 122.

The microswitch 502 may be mounted to the steering wheel 504 using a mounting means 510 provided proximate the microswitch 502. In the approach illustrated in FIG. 13, the mounting means 510 comprises a pair of cable ties and an elongated piece of heat shrink tubing. In other embodiments, the mounting means may comprise other suitable structures for mounting microswitch 502 in the desired location. The wireless transmitter 508 may similarly include a mounting means attached thereto for removably attaching the wireless transmitter 508 to the steering wheel 504.

As shown in FIG. 13, a cable 512 electrically couples the microswitch 502 to the transmitter 508 to form the wireless actuation system 500. Cable 512 in the illustrated embodiment is electrically connected to the microswitch 502 at one end and includes an electrical connector, such as a conventional tip sleeve mini jack or cable jack, at a second end for selectively electrically coupling the microswitch 502 to the transmitter 508 via a mating electrical connector (such as a mating socket connector) provided in one end of the transmitter 508. The mating electrical connector provided on one end of the wireless transmitter 508 removably receives the electrical connector.

The wireless transmitter 508 is preferably in the form of a FOB and may, for example, be a Bluetooth transmitter, and more preferably a Bluetooth Low Energy ("BLE") transmitter.

The microswitch 502 is preferably a normally open switch so that it is closed when the user 106 depresses the button of the microswitch 502 and is open when the user releases the button of the microswitch 502. In some approaches, the wireless transmitter 508 is configured to transmit a first signal when the microswitch 502 is closed. The first signal may, for example, instruct controller 506 to send power to the control unit 120 in order to pump fluids from the fluid source 122 through the fluid delivery system 101 to the user 106. The wireless transmitter 508 may also be configured to transmit a second signal when the microswitch is open. The second signal may, for example, instruct the fluid control unit 120 to not send power to its pump. When the controller 506 receives the second signal, it will stop sending power to the pump in control unit 120 if it was previously sending power to the pump, thereby stopping the pumping of fluids from the fluid source 122 through the fluid delivery system 101 to the user 106. On the other hand, if the control unit 120 had previously received the second signal, such that it had already stopped sending power to the pump, then the control unit 120 will simply continue to not send power to the pump. Then when the first signal is again transmitted to the control unit 120 from the wireless transmitter 508, the control unit 120 will again send power to its pump so that it again begins to pump fluids through the fluid delivery system 101 to the user 106. In this way, the user 106 can control the delivery of fluid from the fluid source 122 on demand by simply pressing and releasing microswitch 502. Importantly, in the illustrated embodiment, the user 106 can press and release the microswitch 502 without ever having to remove his or her hand from the steering wheel 504, so that regardless of how fast the user 106 is traveling in the vehicle 104 or the difficulty of the terrain being traversed, the user 106 is able to instruct the fluid delivery system 101 to deliver the hydration fluid contained within the fluid source 122 as desired while maintaining both hands on the steering wheel 504 and steering the vehicle 104.

While fluid control unit 120 may be configured to provide fluids as long as the user 106 is pressing the microswitch 502 as described above, the fluid control unit 120 may also be configured to provide a defined aliquot of fluids each time the control unit 120 receives the first command signal (e.g., when the user 106 presses the microswitch 502, regardless of how long the user holds down the microswitch). The aliquot, for example, may be a squirt of a certain duration or volume.

In view of the fact that user 106 can safely and conveniently operate microswitch 502 while driving the vehicle 104 under various conditions, it is much more likely that the user 106 will drink fluids from the fluid source 122 more regularly, thereby allowing the user 106 to remain hydrated during his or her ride, race, etc.

The fluid control unit 106 and wireless actuation systems 140 described in co-pending U.S. application Ser. No. 15/652,847, the description of which is hereby incorporated by reference, may be used for control unit 120 and wireless actuation system 500 of the present patent document.

The mouthpiece assemblies 112, 400 described in co-pending U.S. application Ser. No. 15/817,031, the description of which is hereby incorporated by reference, may be used for mouthpiece assembly 112 of the present patent document. Similarly, the microphone boom 267 described in co-pending U.S. application Ser. No. 15/817,031, the description of which is incorporated herein by reference, may be used for the flexible arm 184 described in the present patent document.

The components defining the fluid delivery path of fluid delivery system 101 shown herein are exemplary in nature, and in other embodiments of fluid delivery system 101, additional components, fewer components, or completely different components may be used to form the fluid delivery path of fluid delivery system 101. In general terms, however, the fluid delivery system 101 will typically include a fluid delivery path having a proximal end adapted to be attached to fluid source 122 so that fluid communication between the fluid delivery path and the fluid source 122 may be established. In addition, the fluid delivery path will include an outlet port for delivering liquid fluids to a user from the fluid source 122. For example, liquid may be delivered through outlet port 150 in mouthpiece assembly 112. Further, a magnetic quick connect, such as magnetic quick connect 130, is interposed in the fluid delivery path of the fluid delivery system 101.

Figure 10:
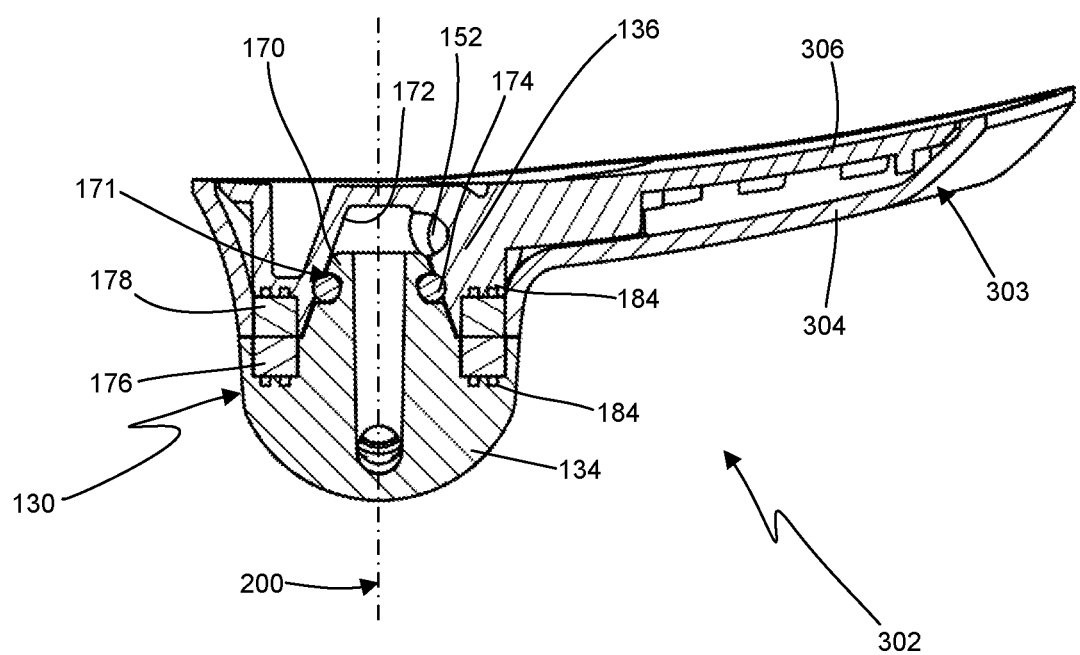
FIG. 10 is a lateral cross-sectional view taken along the mating axis of an alternative embodiment of a helmet mount.
Figure 11:
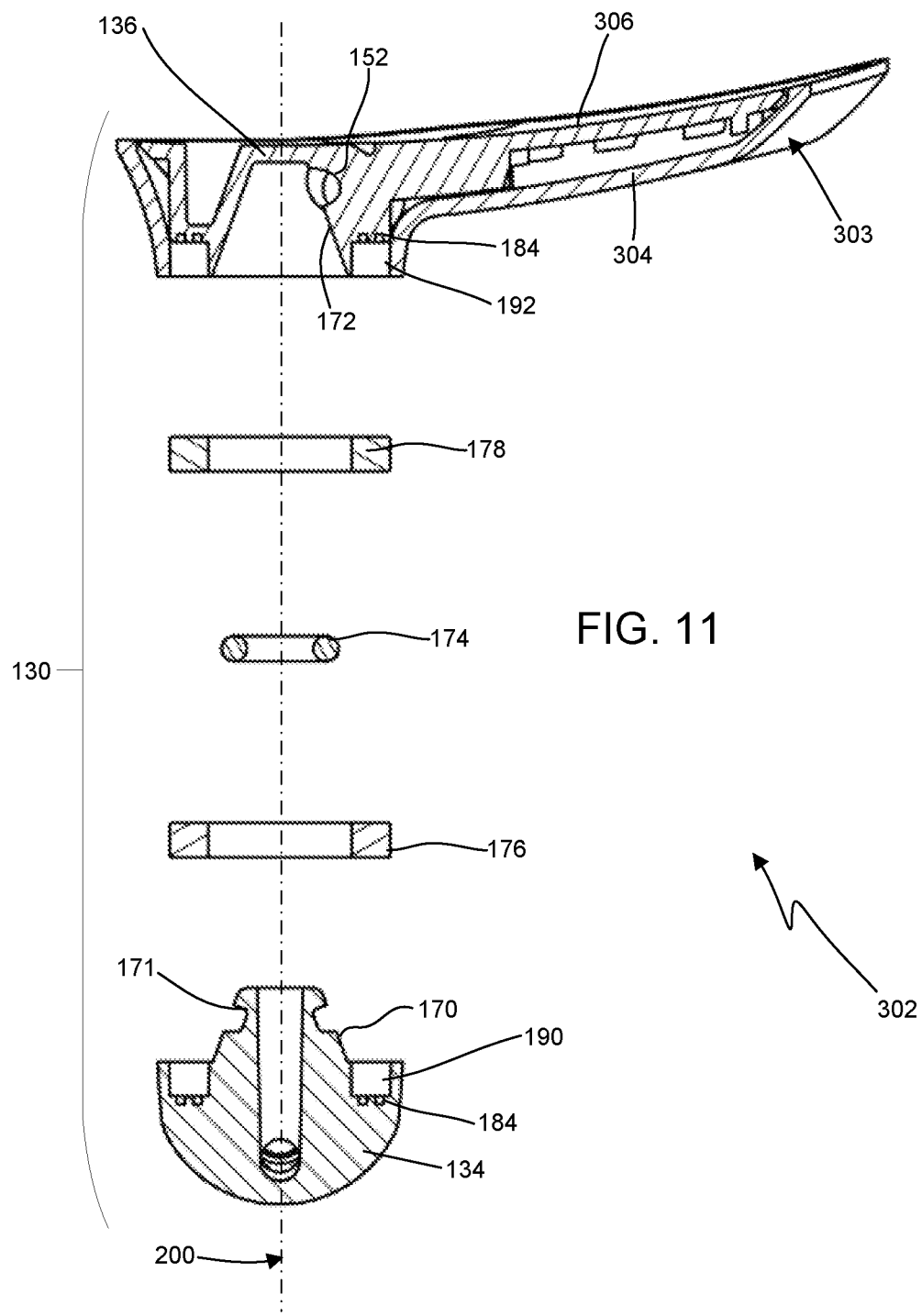
FIG. 11 is an exploded lateral cross-sectional view of the alternative embodiment in which the cross-sectional view is taken from the same cut line as that in FIG. 10.
Figure 12:
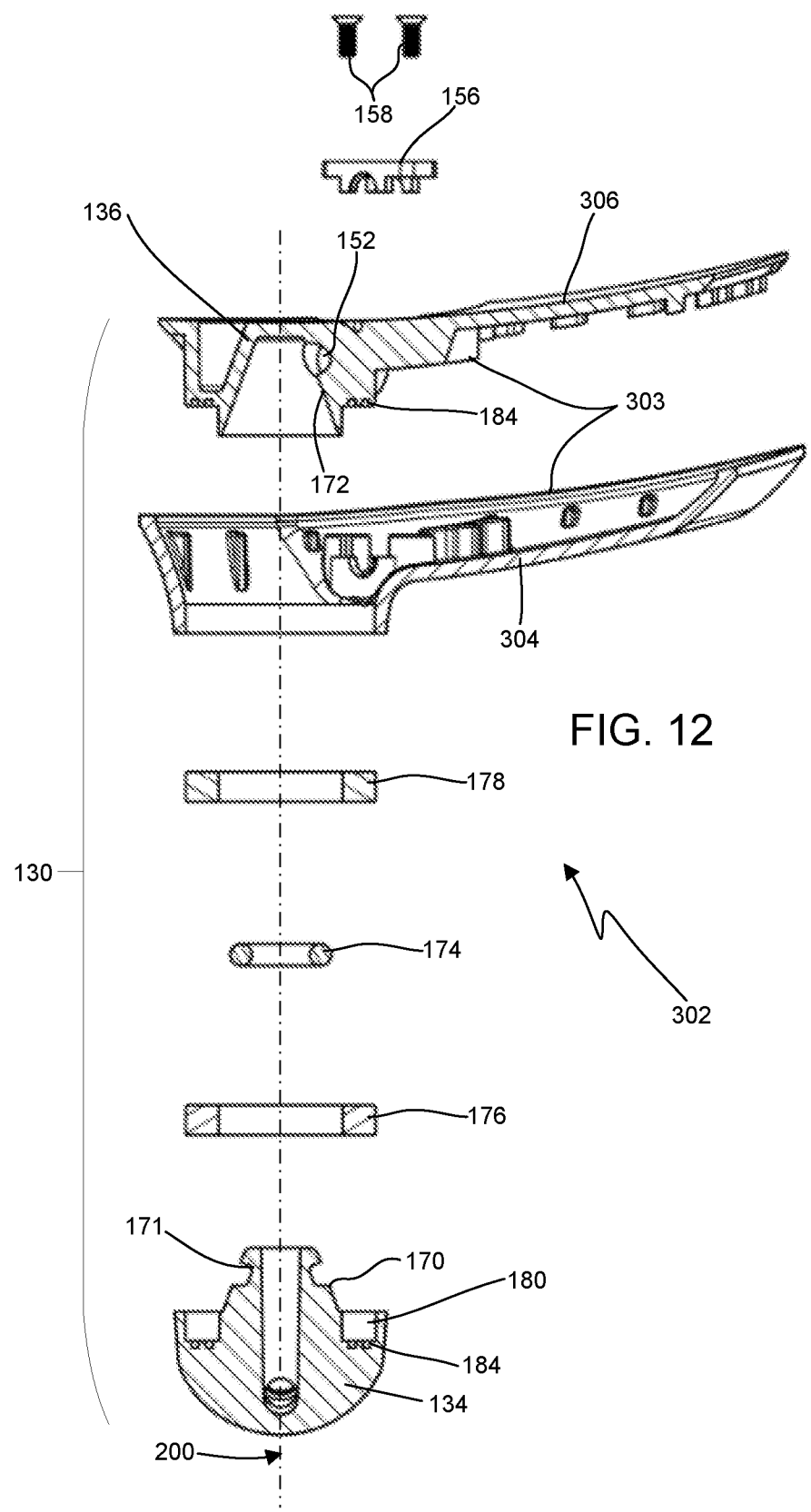
FIG. 12 is another exploded lateral cross-sectional view of the helmet mount of FIG. 10, but which also shows an exploded view of the support structure of the helmet mount.

Referring to FIGS. 9-11, another embodiment of a headgear mount is now described. Headgear mount 302 is the same as headgear mount 132 described in connection with FIGS. 2-9, except that instead of employing a unitary molded support structure 146, the support structure 303 of the mount 302 is formed from a first front half 304 and a second, mating back half 306. The two halves 304, 306 may be attached to one another with adhesive and/or mechanical locking tabs molded into the two halves.

Fabricating the support structure 303 out of two pieces reduces material costs during the fabrication process.

While various embodiments of an improved personal hydration system and its respective components have been presented in the foregoing disclosure, numerous modifications, alterations, alternate embodiments, and alternate materials may be contemplated by those skilled in the art and may be utilized in accomplishing the various aspects of the described inventions. For example, the magnetic quick connects described above may be used in fluid delivery systems and devices other than personal hydration systems, such as the one shown in FIG. 1. They may also be used in the delivery of gasses in addition to liquids. Thus, it is to be clearly understood that the present description is made only by way of example and not as a limitation on the scope of any of the inventions that may be claimed in the claims that follow.

What is claimed:

1. A headset comprising:
   a fluid conduit adapted to connect to a distal end of a hydration system supply tube; and
   a magnetic quick connect having an upstream and a downstream coupling member with a common mating axis and which together define a portion of the fluid conduit, wherein the upstream member comprises an off-axis arm that can rotate about the mating axis without decoupling the coupling members when the headset is mounted to a headgear; and
   a mount including the magnetic quick connect, wherein the mount is adapted to support the quick connect on headgear adapted to be worn on a user's head.

2. A headset according to claim 1, wherein the mount is (i) configured to attach to headgear and support the headset on the headgear once attached, (ii) attached to headgear, or (iii) at least partially formed integral with headgear.

3. A headset according to claim 1, wherein a proximal end of the upstream coupling member comprises a fluid connector adapted to connect to the distal end of a hydration supply tube.

4. A headset according to claim 3, further comprising a valve interposed in the fluid conduit between the fluid connector and a downstream end of the upstream member of the magnetic quick connect.

5. A headset according to claim 1, wherein at least a portion of the fluid conduit downstream of the magnetic quick connect may be selectively adjusted to allow the selective positioning of a fluid outlet port proximate to a user's mouth.

6. A headset according to claim 2, wherein the headgear comprises a helmet.

7. A headset according to claim 6, wherein at least a portion of the mount is formed integral with the helmet.

8. A headset according to claim 1, wherein at least a portion of the fluid conduit downstream of the magnetic quick connect comprises a flexible tube.

9. A headset according to claim 8, further comprising an adjustable arm for supporting the flexible tube on the headgear and configured to permit positioning of a fluid outlet port proximate a user's mouth.

10. A headset according to claim 1, wherein an axial pull force along the mating axis that is greater than or equal to 45 ounce-force and less than or equal to 100 ounce-force between the upstream member and downstream member of the magnetic quick connect is required to decouple the upstream and downstream members of the magnetic quick connect in the axial direction.

11. A headset according to claim 10, wherein the upstream member and downstream member of the magnetic quick connect may also be decoupled by pivoting the off-axis arm of the upstream member toward or away from the downstream member through the application of a torque that is in the range of about 6 ounce-inches to 32 ounce-inches.

12. A headset according to claim 11, wherein the off-axis arm forms a lever arm of greater than or equal to about 0.75 inches and less than or equal to about 2 inches from the pivot point.

13. A headset according to claim 1, wherein one of the upstream and downstream members is a male coupling member and the other is a mating female coupling member.

14. A headset according to claim 13, wherein the male coupling member comprises a protrusion, the female coupling member comprises a matching protrusion receiving area defined by a protrusion mating surface, and the protrusion includes an O-ring disposed around its outer perimeter, and wherein when the male and female coupling members are coupled together, the protrusion extends into the protrusion receiving area, a first fluid communication path provided in the male coupling member and a second fluid communication path provided in the female coupling member are in fluid communication, and the O-ring is compressed between the protrusion and protrusion mating surface.

15. A headset for a hydration system according to claim 14, wherein the protrusion and protrusion mating surface are tapered at an angle from 15° to 50° with respect to the mating axis.

16. A headset for a hydration system according to claim 14, wherein the protrusion and protrusion mating surface are tapered at an angle from 25° to 35° with respect to the mating axis.

17. A headgear mount for a hydration system, the mount comprising:
   a support structure including a downstream coupling member of a magnetic quick connect;
   an upstream coupling member configured to magnetically mate with the downstream member to define a mating axis and a fluid path extending between members, the upstream member comprising an off-axis arm that may be rotated about the mating axis without decoupling the members;
   wherein the fluid path includes an inlet port in the off-axis arm and an outlet port disposed in the downstream coupling member; and
   wherein a proximal end of the upstream coupling member comprises a fluid connector adapted to connect to the distal end of a hydration supply tube.

* * * * *